United States Patent
Kang et al.

(10) Patent No.: US 8,861,376 B2
(45) Date of Patent: Oct. 14, 2014

(54) BROADCAST RECEIVING APPARATUS AND METHOD OF DETERMINING BROADCAST RECEPTION STATE THEREOF

(75) Inventors: Seok-hun Kang, Suwon-si (KR); Seok-woo Yong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 74 days.

(21) Appl. No.: 13/327,147

(22) Filed: Dec. 15, 2011

(65) Prior Publication Data

US 2012/0155288 A1 Jun. 21, 2012

(30) Foreign Application Priority Data

Dec. 15, 2010 (KR) .................. 10-2010-0128620

(51) Int. Cl.
*H04L 1/24* (2006.01)
*H04L 1/20* (2006.01)
*H04H 60/65* (2008.01)
*H04W 16/14* (2009.01)
*H04H 60/32* (2008.01)
*H04W 28/04* (2009.01)

(52) U.S. Cl.
CPC .......... *H04W 16/14* (2013.01); *H04W 28/048* (2013.01); *H04H 60/65* (2013.01); *H04H 60/32* (2013.01)

USPC .................. 370/245; 370/329; 370/461

(58) Field of Classification Search
CPC ... H04L 43/065; H04L 43/08; H04W 72/085; H04W 88/12
USPC .......................... 370/245, 329, 461
See application file for complete search history.

(56) References Cited

U.S. PATENT DOCUMENTS

| | | | |
|---|---|---|---|
| 2005/0174976 A1* | 8/2005 | Wang | 370/341 |
| 2006/0281455 A1* | 12/2006 | Hayasaka | 455/426.1 |
| 2007/0165754 A1* | 7/2007 | Kiukkonen et al. | 375/346 |
| 2007/0250871 A1* | 10/2007 | Wu et al. | 725/81 |
| 2008/0043658 A1* | 2/2008 | Worrall | 370/312 |

* cited by examiner

*Primary Examiner* — Michael Thier
*Assistant Examiner* — Brian Cox
(74) *Attorney, Agent, or Firm* — Sughrue Mion, PLLC

(57) ABSTRACT

A method of determining a broadcast reception state of a broadcast receiving apparatus includes receiving a broadcast signal using a tuner; checking a reception state of the broadcast signal; changing a wireless communication connection state of the wireless communication module if the reception state of the broadcast signal is abnormal and rechecking the reception state; and determining the reception state as an abnormal reception state due to interference with a wireless communication frequency if a result of rechecking the reception state indicates the reception state is normal.

18 Claims, 9 Drawing Sheets

| 69 | 800 ~ 806 |
|---|---|
| 70 | 806 ~ 812 |
| 71 | 812 ~ 818 |
| 72 | 818 ~ 824 |
| 73 | 824 ~ 830 |
| 74 | 830 ~ 836 |
| 75 | 836 ~ 840 |
| 76 | 842 ~ 848 |
| 77 | 848 ~ 854 |
| 78 | 854 ~ 860 |
| 79 | 860 ~ 866 |
| 80 | 866 ~ 872 |
| 81 | 872 ~ 878 |
| 82 | 878 ~ 884 |
| 83 | 884 ~ 890 |

FIG. 5

<NOTICE>
SINCE THE BROADCAST RECEPTION STATE IS ABNORMAL DUE TO INTERFERENCE WITH THE WIRELESS COMMUNICATION, THE WIRELESS COMMUNICATION CHANNEL IS CHANGED.

FIG. 7

<NOTICE>
THE BROADCAST QUALITY IS
ABNORMAL CAUSED BY INTERFERENCE
WITH THE WIRELESS COMMUNICATION.
PLEASE CHANGE THE WIRELESS
COMMUNICATION CHANNEL.

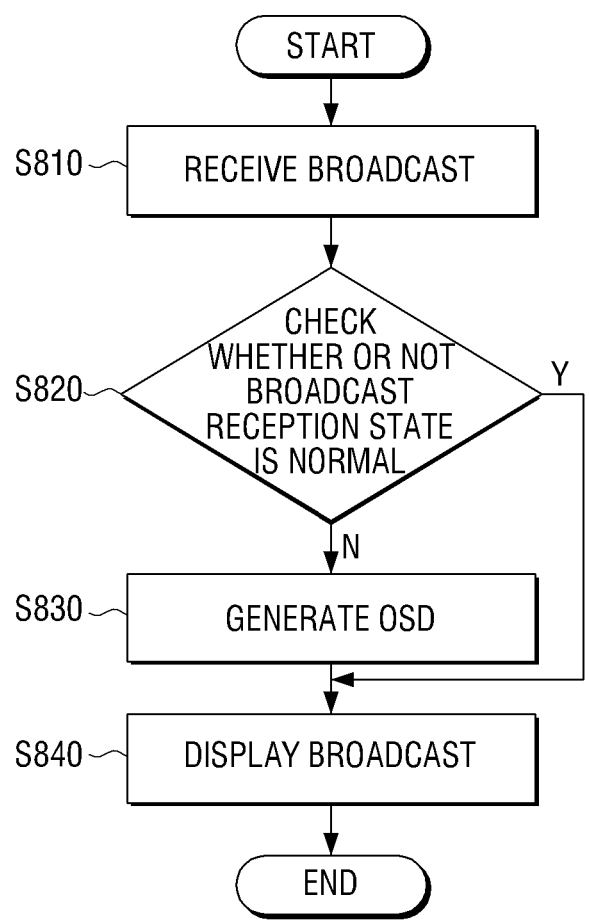

BROADCAST RECEIVING APPARATUS AND METHOD OF DETERMINING BROADCAST RECEPTION STATE THEREOF

CROSS-REFERENCE TO RELATED APPLICATION

This application claims priority from Korean Patent Application No. 10-2010-0128620, filed on Dec. 15, 2010, in the Korean Intellectual Property Office, the disclosure of which is incorporated herein by reference in its entirety.

BACKGROUND

1. Field

Apparatuses and methods consistent with exemplary embodiments relate to a broadcast receiving apparatus and a method of determining a broadcast reception state applied thereto, and more particularly, to a broadcast receiving apparatus including a wireless communication module capable of wireless communication with the outside and a method of determining a broadcast reception state applied thereto.

2. Description of the Related Art

As development of a wireless communication environment, various home appliances in addition to portable wireless devices which include wireless communication modules for communicating with the outside are being released.

Broadcast receiving apparatuses which receive broadcast signals through wired/wireless communication such as digital televisions (DTVs) also includes wireless communication modules for wireless communication with the outside. The broadcast receiving apparatuses perform an access point (AP) function of a wireless communication system or a client function.

FIG. 1A is a diagram illustrating a wireless communication system 100 when a broadcast receiving apparatus 120 performs a client function. As shown in FIG. 1A, the broadcast receiving apparatus 120 performs wireless communication with an AP 110 through a wireless module. The wireless communication may be Wi-Fi, ultra wide band (UWB), a wireless local area network (LAN), and the like.

However, during the wireless communication process with the broadcast receiving apparatus 120 and the AP 110, when the frequency of a wireless communication channel between the broadcast receiving apparatus 120 and the AP 110 corresponds to a high frequency of a broadcast channel received by a tuner unit of the broadcast receiving apparatus, channel interference is caused in the broadcast channel selected by the tuner unit due to the wireless communication with the outside.

For example, as shown in FIG. 1B, the broadcast channels No. 69 to 83 have a frequency band of about 800 Mhz to 890 MHz in Korea. As shown in FIG. 1C, a Wi-Fi wireless communication system has a frequency band of about 2.402 GHz to 2.483 GHz. When watching a specific broadcast channel (for example, a channel No. 71) received through the broadcast receiving apparatus 120 and at the same time communicating with the outside through a specific wireless channel (for example, a channel including 2.43 GHz) of Wi-Fi wireless communication channels, since the frequency of the specific wireless channel corresponds to three harmonics of the specific broadcast channel, channel interference is caused in the specific broadcast channel selected by the broadcast receiving apparatus 120 due to the wireless communication with the outside. Thus, a viewer can not watch the specific broadcast channel well due to the channel interference.

Particularly, the wireless communication channel must be switched to another wireless channel in order to avoid the channel interference. However, if the reception state of the specific broadcast channel is abnormal when watching the specific broadcast received by the broadcast receiving apparatus, a user cannot know whether the reception state of the specific broadcast channel is abnormal due to the channel interference or another reason.

Therefore, if the reception state of the specific broadcast channel is abnormal when watching the specific broadcast received by the broadcast receiving apparatus as described above, it is necessary for seeking a solution to determine whether or not the reception state of the specific broadcast channel is abnormal due to the channel interference and to notify a user of a determination result.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide a broadcasting receiving apparatus and a method of determining a broadcast reception state applied thereto which changes a wireless communication connection state of a wireless communication module if a broadcast reception state of the broadcast reception apparatus is abnormal, rechecks the broadcast reception state, and determines the broadcast reception state as an abnormal state due to interference with a wireless communication frequency if the broadcast reception state is normal as a rechecking result.

According to an aspect of an exemplary embodiment, there is provided a method of determining a broadcast reception state of a broadcast receiving apparatus which includes a tuner and a wireless communication module. The method may include: receiving a broadcast signal using the tuner; checking a reception state of the broadcast signal; changing a wireless communication connection state of the wireless communication module if the reception state of the broadcast signal is abnormal and rechecking the reception state; and determining the reception state as an abnormal state caused by interference with a wireless communication frequency if a result of rechecking the reception state indicates the reception state is normal.

The changing the wireless communication connection state of the wireless communication module may be any one of disconnecting a wireless communication connection, switching a wireless communication channel, and turning off the wireless communication module.

The checking the reception state may include checking the reception state by measuring a packet error rate (PER) of the received broadcast signal.

The checking the reception state may include determining the reception state as an abnormal state when the PER is equal to or greater than a preset value.

In the case where the broadcast receiving apparatus has a wireless communication access point (AP) function, the method may further include switching a wireless communication channel used by the wireless communication module to a new wireless communication channel if a result of rechecking the reception state indicates the reception state is a normal state.

The method may further include displaying an on screen display (OSD) including information indicating that a wireless communication channel used by the wireless communication module is switched.

The switched wireless communication channel may be a channel having a farthest frequency band from a wireless communication channel previously used of channels within a frequency band used by the wireless communication module.

In the case where the broadcast receiving apparatus is a client of a wireless communication device, the method may further include changing a current wireless communication connection state of the wireless communication device back to a previous wireless communication connection state to communicate with an external AP, if a result of rechecking the reception state indicates the reception state is a normal state; and displaying an on screen display OSD including information indicating that the reception state is abnormal caused by channel interference with a wireless communication frequency and information recommending switching the wireless channel communicated with the outside.

The communication module may use a Wi-Fi wireless environment.

According to an aspect of another exemplary embodiment, there is provided a broadcast receiving apparatus. The broadcast receiving apparatus may include: a broadcast receiving unit which receives a broadcast signal; a wireless communication module which performs wireless communication with the outside; and a control unit which changes a wireless communication connection state of the wireless communication module if a reception state of the broadcast is abnormal and determines the reception state as an abnormal state caused by interference with a wireless communication frequency if the reception state is normal after changing the wireless communication connection state.

The changing the wireless communication connection state of the wireless communication module may be any one of disconnecting the wireless communication, switching a wireless communication channel, and turning off the wireless communication module.

The broadcast receiving unit may include a tuner unit which selects a received broadcast signal and measures a packet error rate (PER) of the selected broadcast signal. The control unit may check the reception state using the PER of the received broadcast signal measured through the tuner unit.

The control unit may determine the reception state as an abnormal state if the PER is equal to or greater than a preset value.

In the case where the broadcast receiving apparatus has a wireless communication access point (AP) function, the control unit may switch the wireless communication channel used by the wireless communication module to a new wireless communication channel if the reception state is normal after changing the wireless communication connection state.

The broadcast receiving apparatus may further include a display unit which displays an on screen display (OSD) and the control unit may control the display unit display the OSD including information indicating that the wireless communication channel used by the wireless communication module is switched.

The switched wireless communication channel may be a channel having a farthest frequency band from a wireless communication channel previously used of channels within a frequency band used by the wireless communication module.

In the case where the broadcast receiving apparatus is a client of a wireless communication device, the control unit may change the wireless communication connection state back to a previous wireless communication connection state to communicate with an external AP if the reception state is normal after changing the wireless communication connection state, and control the display unit to display the OSD including information indicating that the reception state is abnormal caused by channel interference with a wireless communication frequency and information for recommending switching a wireless communication channel communicated with the outside.

The wireless communication module may use a Wi-Fi wireless environment.

Additional aspects and advantages of the exemplary embodiments will be set forth in the detailed description, will be obvious from the detailed description, or may be learned by practicing the exemplary embodiments.

BRIEF DESCRIPTION OF THE DRAWINGS

The above and/or other aspects will be more apparent by describing in detail exemplary embodiments, with reference to the accompanying drawings, in which:

FIG. 5 is view illustrating an on screen display (OSD) of a broadcast receiving apparatus in the case where the broadcast receiving apparatus is an AP according to an exemplary embodiment;

FIG. 7 is view illustrating an OSD of a broadcast receiving apparatus in the case where the broadcast receiving apparatus is not an AP according to an exemplary embodiment; and FIG. 8 is a flowchart illustrating a method of determining a broadcast reception state of a broadcast receiving apparatus according to another exemplary embodiment.

DETAILED DESCRIPTION OF THE EXEMPLARY EMBODIMENTS

Figure 1A:
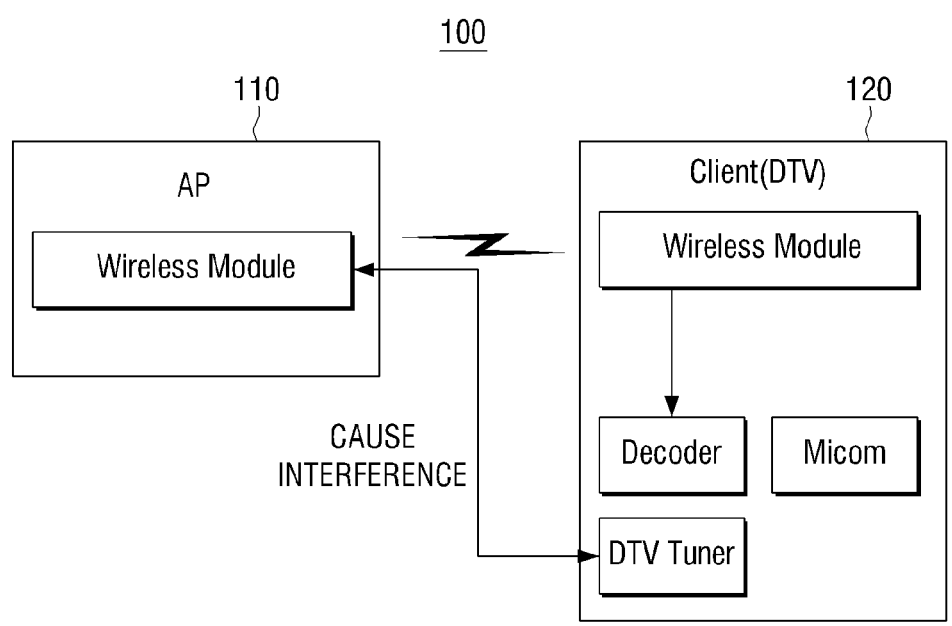
FIGS. 1A to 1C are views for explaining channel interference caused by external wireless communication in a broadcast receiving apparatus of the related art.
Figures 1B, 1C:
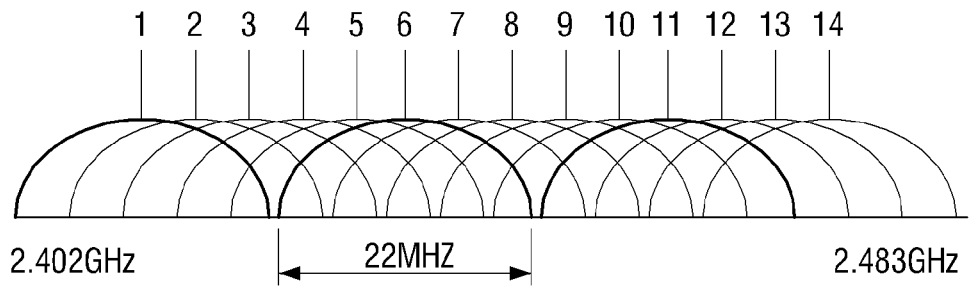

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

1. Method of Determining Broadcast Reception State

Figure 2:
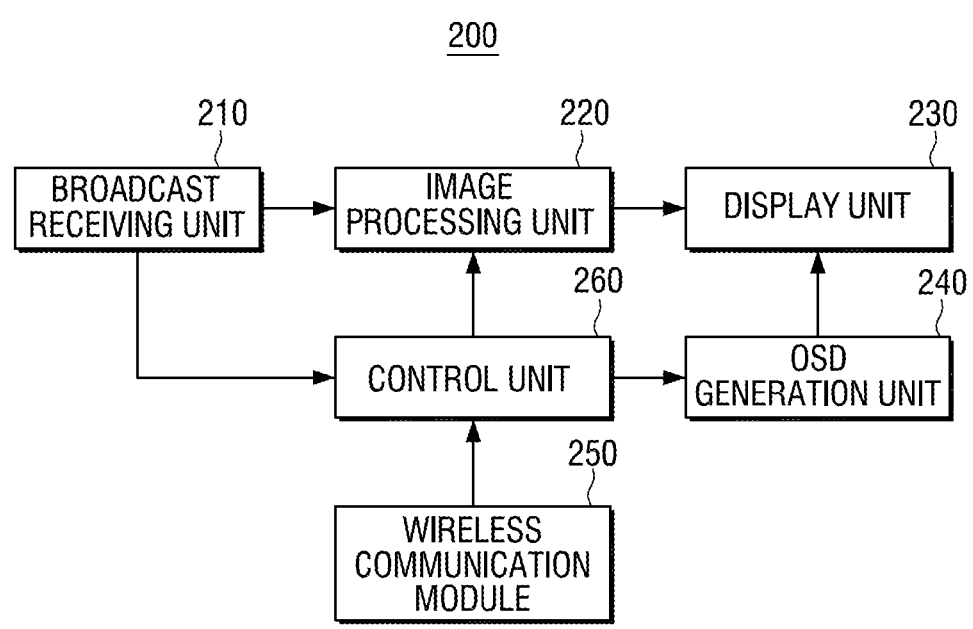
FIG. 2 is a block diagram illustrating a broadcast receiving apparatus according to an exemplary embodiment.
Figure 3:
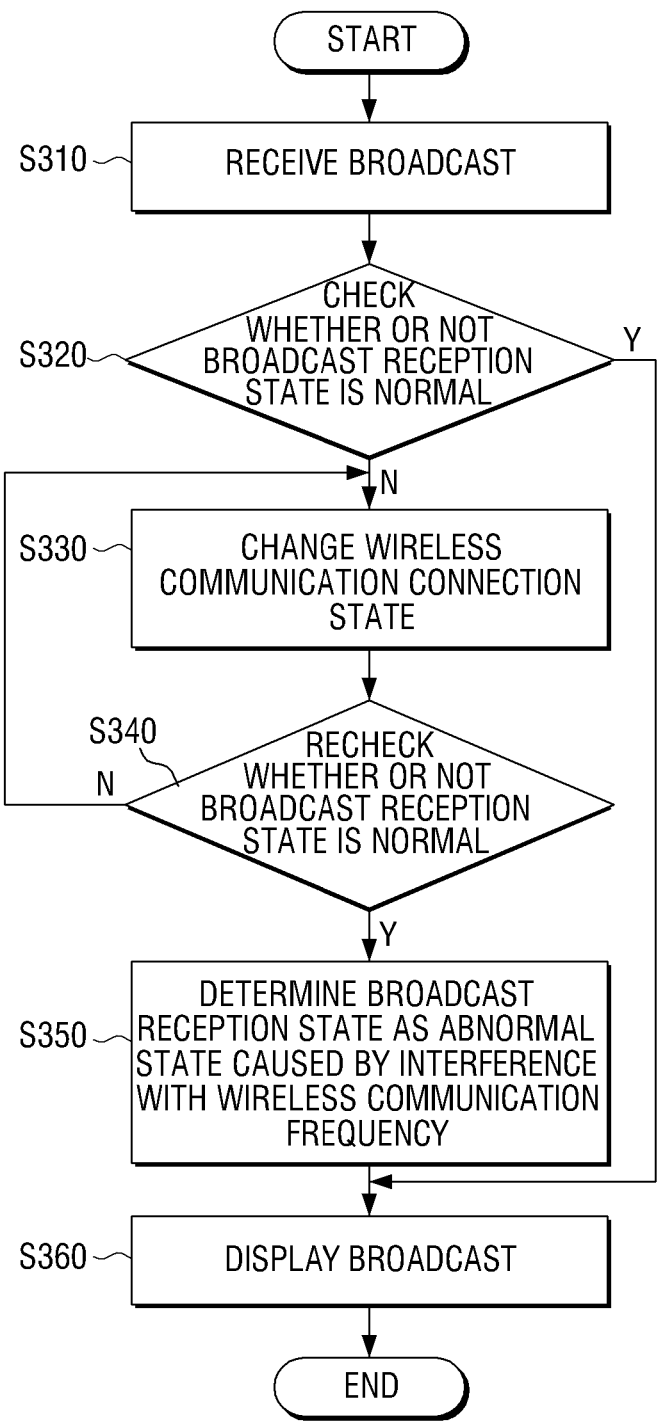
FIG. 3 is a flowchart illustrating a method of determining a broadcast reception state of a broadcast receiving apparatus according to an exemplary embodiment.

Hereinafter, a method of determining a broadcast reception state when the broadcast reception state is abnormal due to interference with external wireless communication is described with reference to FIGS. 2 and 3. FIG. 2 is a block diagram illustrating a broadcast receiving apparatus 200 according to an exemplary embodiment. As shown in FIG. 2, the broadcast receiving apparatus 200 includes a broadcast receiving unit 210, an image processing unit 220, a display unit 230, an on screen display (OSD) generation unit 240, a wireless communication module 250 and a control unit 260.

The broadcast receiving unit 210 receives a wired/wireless broadcast from a broadcasting station or a satellite and demodulates the received broadcast. The broadcast receiving unit 210 includes a tuner (not shown) which selects the received broadcast signal. The tuner selects the received broadcast signal and further measures a packet error rate (PER) of the selected broadcast signal and transmits a measurement result to the control unit 260.

The image processing unit 220 performs signal processing such as video decoding, video scaling for a broadcast image input from the broadcast receiving unit 210, or the like.

The display unit 230 displays a signal-processed broadcast image transmitted from the image processing unit 220. The display unit 230 outputs an OSD generated from the OSD generation unit 240 according to a control of the control unit 260.

The OSD generation unit 240 generates the OSD for providing to a user. The OSD generation unit 240 may generate the OSD including information as shown in FIGS. 5 and 7 according to a determination result of a broadcast reception state. A detailed method of displaying the OSD according to the determination result of the broadcast reception state will be described with reference to FIGS. 3 through 7.

The wireless communication module 250 wireless communicates with an external access point (AP) or a client. Specifically, when the broadcast receiving apparatus 200 is the AP, the wireless communication module 250 wirelessly communicates with an external client. When the broadcast receiving apparatus 200 is the client, the wireless communication module 250 wirelessly communicates with the external AP.

The wireless communication module 250 may use a Wi-Fi communication environment. The Wi-Fi communication system uses a frequency having a band of about 2.4 GHz.

The control unit 260 understands a user instruction on the basis of manipulation content transmitted from a user manipulation unit (not shown) and controls an overall operation of the broadcast receiving apparatus 200 according to the understood user instruction.

The control unit 260 checks whether or not the broadcast reception state is normal and changes a wireless communication connection state of the wireless communication module 250 if the broadcast reception state is abnormal. After changing the wireless communication connection state, the control unit 260 rechecks the broadcast reception state. If the broadcast reception state is normal as the rechecking result, the control unit 260 determines the broadcast reception state as an abnormal state due to interface with a wireless communication frequency.

The control unit 260 checks whether or not the broadcast reception state is normal on the basis of the PER output from the tuner. The control unit 260 determines the broadcast reception state as an abnormal state if the PER output from the tuner is equal to or greater than a preset value and determines the broadcast reception state as a normal state if the PER is less than the preset value.

If the broadcast reception state is determined as the abnormal state, the control unit 260 controls the wireless communication module 250 to change the wireless communication connection state. In order not to use the wireless communication channel currently communicating with the outside, the control unit 260 may perform any one of operations of disconnecting the wireless communication, switching the wireless communication channel, or turning off the power of the wireless communication module 250. When switching the wireless communication channel, the control unit 260 may switch the wireless communication channel to a channel having the farthest frequency band from the previously used channel of channels within a frequency band used by the wireless communication module 250. However, this is only one exemplary embodiment. The inventive concept may be applied to the case of switching the channel to a channel having the best communication quality of the channels within the frequency band used by the wireless communication module 250.

After changing the wireless communication connection state, the control unit 260 rechecks whether or not the broadcast reception is normal. The control unit 260 may check whether or not the broadcast reception state is normal based on the PER as described above.

If it is determined that the broadcast reception state is normal as a rechecking result, the control unit 260 determines that the abnormal broadcast reception state is caused by interference with the wireless communication frequency. If it is determined that the broadcast reception state is abnormal, the control unit 260 may again change the wireless communication state. However, if it is determined that the broadcast reception state is continuously abnormal, the control unit 260 may determine the abnormal broadcast reception state is caused by a reason other than interference with the wireless communication frequency.

When the broadcast reception state is abnormal as a result of interference with the wireless communication frequency, the control unit 260 may generate and display an OSD to inform a user of the abnormal reception state. In addition, when the broadcast receiving apparatus 200 is an AP, the control unit 260 may control the wireless communication module 250 directly to switch the wireless communication channel.

As described above, the broadcast receiving apparatus 200 of the exemplary embodiment checks the broadcast reception state by switching the wireless communication channel communicated with the outside if the broadcast reception state is abnormal so that it is possible for a user to determine whether or not the abnormal reception state is caused by interference due to the wireless communication with the outside. Thus, the user may switch the wireless communication channel directly communicated with the outside or the broadcast receiving apparatus 200 may automatically switch the wireless communication channel to make the broadcast reception state be normal according to a determination result.

Hereinafter, a method of determining a broadcast reception state of the broadcast receiving apparatus 200 with reference to FIG. 3. FIG. 3 is a flowchart illustrating a method of determining a broadcast reception state of the broadcast receiving apparatus 200 according to an exemplary embodiment.

First, the broadcast receiving apparatus 200 receives a broadcast from the outside (S310). The broadcast receiving apparatus 200 checks whether or not a broadcast reception state of the received broadcast is normal (S320). The broadcast receiving apparatus 200 may check whether or not the broadcast reception state is normal according to the PER measured from the tuner. However, this is only one exemplary embodiment. The broadcast receiving apparatus 200 may check whether or not the broadcast reception state is normal through another method.

If the broadcast reception state is normal (S320-Y), the broadcast receiving apparatus 200 displays the received broadcast (S360). However, if the broadcast reception state is abnormal (S320-N), the broadcast receiving apparatus 200 changes a wireless communication connection state (S330). The broadcast receiving apparatus 200 may disconnect the wireless communication, switch a wireless communication channel, or turn off the power of the wireless communication module 250.

After changing the wireless communication connection state, the broadcast receiving apparatus 200 rechecks whether or not the broadcast reception state is normal (S340). If it is determined as a result of rechecking that the broadcast reception state is normal (S340-Y), since the previous wireless communication channel corresponded to a high frequency of a broadcast channel, the broadcast receiving apparatus 200 may determine the broadcast reception state as an abnormal state due to interference with a frequency of the wireless communication channel (S350).

If the abnormal broadcast reception state is solved by changing the wireless communication connection state, the broadcast receiving apparatus 200 displays the broadcast (S360).

Thereby, the broadcast receiving apparatus 200 determines the broadcast reception state as an abnormal state caused by interference with the frequency of the wireless communication channel so that it is possible for a user to switch the wireless communication channel to remove the interference with the frequency of the wireless communication channel.

Figure 4:
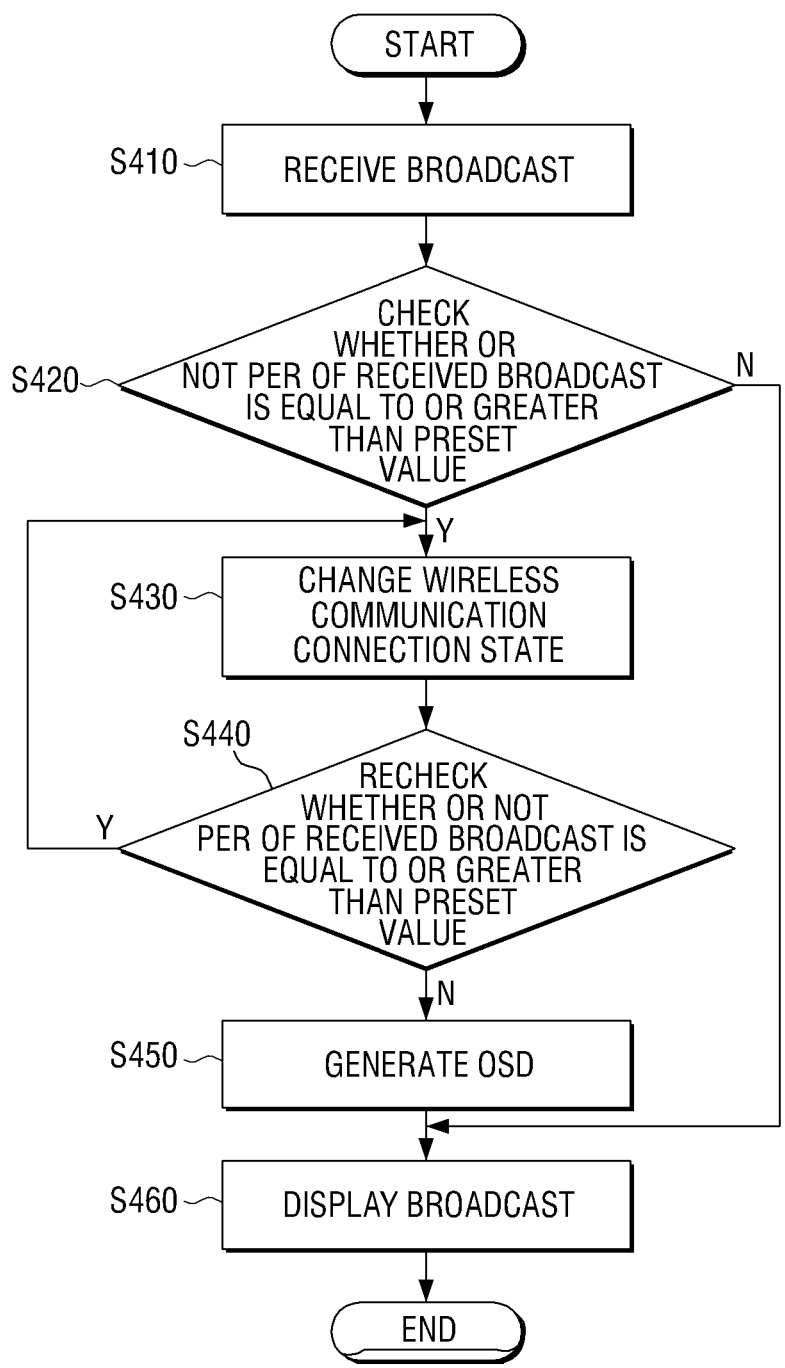
FIG. 4 is a flowchart illustrating a method of determining a broadcast reception state in the case where a broadcast reception apparatus is an access point (AP) according to an exemplary embodiment.

2. Method of Determining Broadcast Reception State in the Case where the Broadcast Receiving Apparatus is an AP Hereinafter, a method of determining a broadcast reception state in the case where the broadcast receiving apparatus is an AP will be described with reference to FIGS. 4 and 5. FIG. 4 is a flowchart illustrating a method of determining a broadcast reception state in the case where the broadcast receiving apparatus 200 is an AP according to an exemplary embodiment.

The broadcast receiving apparatus 200 which is an AP of a wireless communication system receives a wired/wireless broadcast signal (S410). The broadcast receiving apparatus 200 checks whether or not a PER of the received broadcast signal is equal to or greater than a preset value to determine whether or not the received broadcast signal is normal (S420). If the PER of the received broadcast signal is equal to or greater than the preset value (S420-Y), the broadcast receiving apparatus 200 switches a wireless communication channel (S430). For example, the broadcast receiving apparatus 200 may switch the wireless communication channel to a channel having the farthest frequency band from the previously used channel of channels within a frequency band used by the wireless communication module 250 or switch the wireless communication channel to a channel having the best communication quality of the channels within the frequency band used by the wireless communication module 250. However, the above described channel switching method is only one exemplary embodiment. The broadcast receiving apparatus 200 may arbitrarily select any one of the channels within the frequency band used by the wireless communication module 250.

After switching the wireless communication channel, the broadcast receiving apparatus 200 rechecks whether or not the PER of the received broadcast signal is greater than or equal to the preset value (S440). If the PER is less than the preset value (S440-N), the broadcast receiving apparatus 200 generates an OSD including information indicating that the broadcast reception state is abnormal due to interference with a wireless communication frequency or information indicating that the wireless communication channel is switched (S450).

For example, as shown in FIG. 5, the broadcast receiving apparatus 200 may generate and display the OSD including guidance information such as "Since the broadcast reception state is abnormal due to interference with the wireless communication, the wireless communication channel is switched." However, the guidance information wording is only one exemplary embodiment. The broadcast receiving apparatus 200 may notify a user of information indicating that "the broadcast reception state is abnormal" and information indicating that "the wireless communication channel is switched to another wireless communication channel" as examples of other wordings. In addition, after generating the OSD, since the broadcast receiving apparatus 200 is itself an AP, the broadcast receiving apparatus 200 can use the switched wireless communication channel as it is.

The broadcast receiving apparatus 200 displays the received broadcast signal (S460).

Thus, in the case where the broadcast receiving apparatus 200 is an AP, when the broadcast reception state is abnormal, the broadcast receiving apparatus 200 automatically switches the wireless communication channel to remove the interference caused by the wireless communication.

Figure 6:
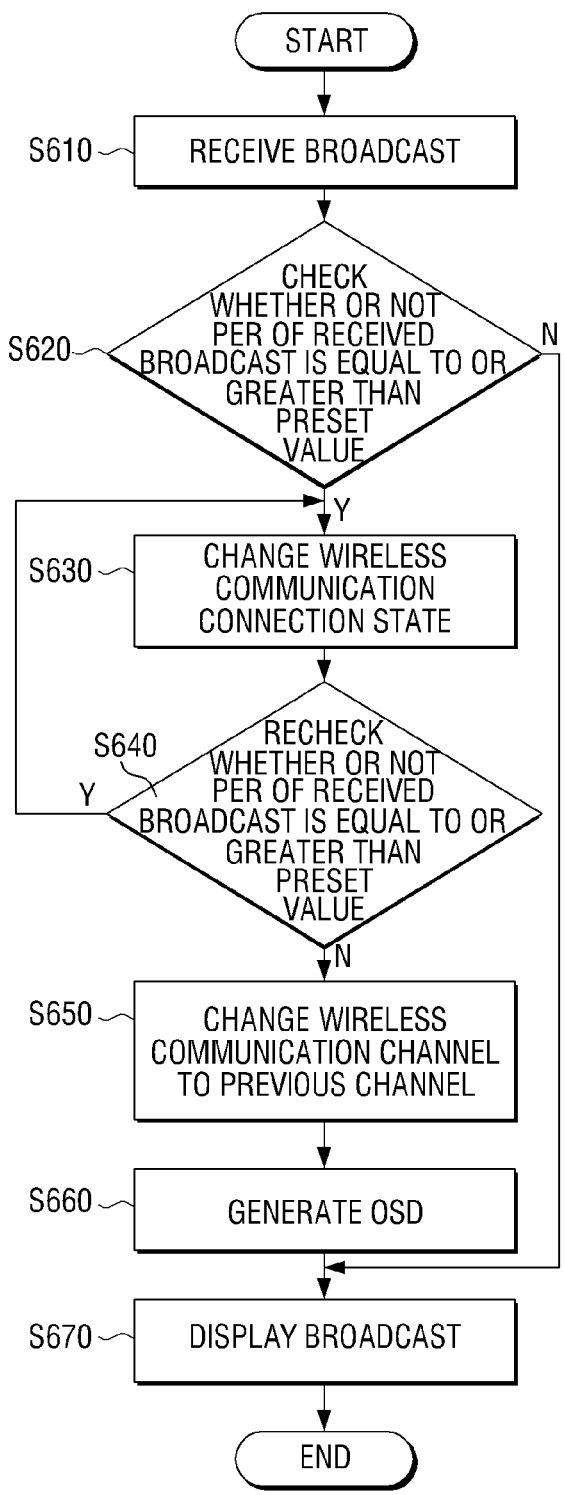
FIG. 6 is a flowchart illustrating a method of determining a broadcast reception state in the case where a broadcast reception apparatus is not an AP according to an exemplary embodiment.

3. Method of Determining Broadcast Reception State in the Case where the Broadcast Receiving Apparatus is not an AP Hereinafter, a method of determining a broadcast reception state in the case where the broadcast receiving apparatus is not an AP will be described with reference to FIGS. 6 and 7. FIG. 6 is a flowchart illustrating a method of determining a broadcast reception state in the case where the broadcast receiving apparatus 200 is not an AP according to an exemplary embodiment.

If the broadcast receiving apparatus 200 is not an AP, steps S610 to S640 of the broadcast reception state determination method as shown in FIG. 6 are the same as steps S410 to S440 of the broadcast reception state determination method as shown in FIG. 4 and detailed description thereof will be omitted.

After step S640, if the PER of the received broadcast signal is less than the preset value, the broadcast receiving apparatus 200 switches the wireless communication channel to the previous wireless communication channel (S650). Specifically, if the broadcast receiving apparatus 200 is a client, since the broadcast receiving apparatus 200 has no right to occupy the wireless communication channel for communicating with an AP, the broadcast receiving apparatus 200 switches the wireless communication channel back to the previous wireless communication channel to communicate with the AP again.

The broadcast receiving apparatus 200 generates an OSD including information indicating that the broadcast reception state is abnormal caused by interference with a wireless communication frequency or information for recommending a switch of the wireless communication channel (S660).

For example, as shown in FIG. 7, the broadcast receiving apparatus 200 may generate and display the OSD including guidance information such as "The broadcast quality is abnormal caused by interference with the wireless communication. Please switch the wireless communication channel." However, the guidance information wording is only one exemplary embodiment. The broadcast receiving apparatus 200 may notify a user of information indicating that "the broadcast reception state is abnormal" and information indicating that "the wireless communication channel is switched to another wireless communication channel" as examples of other wordings. Next, the broadcast receiving apparatus 200 displays the received broadcast signal (S670).

Thus, in the case where the broadcast receiving apparatus 200 is not an AP, the user recognizes that the broadcast reception state is abnormal caused by interference with the wireless communication and switches the wireless communication channel using an external AP to remove the interference with the wireless communication.

4. Other Embodiments

As described above, the inventive concept may be applied to exemplary embodiments other than the exemplary embodiment of changing the wireless communication state to determine that the broadcast reception state is abnormal caused by interference with the wireless communication frequency.

For example, as shown in FIG. 8, the broadcast receiving apparatus 200 receives a wired/wireless broadcast signal (S810). The broadcast receiving apparatus 200 checks whether or not the broadcast reception state is normal by measuring a PER of the received broadcast signal (S820).

If the broadcast reception state is abnormal (S820-N), the broadcast receiving apparatus 200 directly generates an OSD without changing a wireless communication system state (S830). At this time, the generated OSD may include information indicating that "the broadcast quality is abnormal caused by interference with the wireless communication," and information for recommending to switch the wireless communication channel, as shown in FIG. 7. The abnormal broadcast reception state is mainly caused by interference with the wireless communication frequency if the broadcast receiving apparatus 200 includes the wireless communication module 250. Thus, it is possible for the user to recognize through the OSD that the abnormal reception state is caused by interference with the wireless communication frequency and to directly switch the wireless communication channel.

After switching the wireless communication channel, the broadcast receiving apparatus 200 displays the received broadcast (S840).

As described above, if the broadcast reception state is abnormal, the broadcast receiving apparatus 200 directly generates the OSD without switching the wireless communication channel so that it is possible for the broadcast receiving apparatus 200 to notify a user of the interference with the wireless communication channel without a complicated operation.

The foregoing embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of determining a broadcast reception state of a broadcast receiving apparatus which includes a tuner and a wireless communication module, the method comprising:

receiving a broadcast signal using the tuner;
checking a reception state of the received broadcast signal during a wireless communication process with the broadcast receiving apparatus and an external device;
changing a wireless communication connection state of the wireless communication module if the reception state of the broadcast signal is abnormal and rechecking the reception state; and
determining the reception state as an abnormal state caused by interference with a wireless communication frequency if a result of rechecking the reception state indicates the reception state is normal, and determining the reception state as an abnormal state caused by a reason other than interference with the wireless communication frequency if the result of rechecking the reception state indicates the reception state is continuously abnormal.

2. The method as claimed in claim 1, wherein the changing the wireless communication connection state of the wireless communication module is any one of disconnecting a wireless communication connection, switching a wireless communication channel, and turning off the wireless communication module.

3. The method as claimed in claim 1, wherein the checking the reception state includes checking the reception state by measuring a packet error rate (PER) of the received broadcast signal.

4. The method as claimed in claim 3, wherein the determining the reception state as an abnormal state includes determining that the PER is equal to or greater than a preset value.

5. The method as claimed in claim 1, further comprising, if the broadcast receiving apparatus has a wireless communication access point (AP) function, switching a wireless communication channel used by the wireless communication module to a new wireless communication channel if a result of rechecking the reception state indicates the reception state is a normal state.

6. The method as claimed in claim 5, further comprising displaying an on screen display (OSD) including information indicating that a wireless communication channel used by the wireless communication module is switched.

7. The method as claimed in claim 5, wherein the switched wireless communication channel is a channel having a farthest frequency band from a frequency band of a wireless communication channel previously used of channels within a frequency band used by the wireless communication module.

8. The method as claimed in claim 1, further comprising:
if the broadcast receiving apparatus is a client of a wireless communication device, changing a current wireless communication connection state of the wireless communication device back to a previous wireless communication connection state to communicate with an external access point (AP), if a result of rechecking the reception state indicates the reception state is a normal state; and
displaying an on screen display OSD including information indicating that the reception state is abnormal caused by channel interference with a wireless communication frequency and information recommending switching the wireless communication channel to a new wireless communication channel.

9. The method as claimed in claim 1, wherein the communication module uses a Wi-Fi wireless environment.

10. A broadcast receiving apparatus, comprising:
a broadcast receiving unit which receives a broadcast signal;
a wireless communication module which performs wireless communication with an external device; and a control unit which changes a wireless communication connection state of the wireless communication module if a reception state of the received broadcast signal is abnormal during a wireless communication process with the broadcast receiving apparatus and the external device, determines the reception state as an abnormal state caused by interference with a wireless communication frequency if the reception state is normal after changing the wireless communication connection state, and determines the reception state as an abnormal state caused by a reason other than interference with the wireless communication frequency if the reception state is continuously abnormal after changing the wireless communication connection state.

11. The broadcast receiving apparatus as claimed in claim 10, wherein the changing the wireless communication connection state of the wireless communication module is any one of disconnecting the wireless communication, switching a wireless communication channel, and turning off the wireless communication module.

12. The broadcast receiving apparatus as claimed in claim 10, wherein the broadcast receiving unit includes a tuner unit which selects a received broadcast signal and measures a packet error rate (PER) of the selected broadcast signal, and the control unit checks the reception state using the PER of the received broadcast signal measured through the tuner unit.

13. The broadcast receiving apparatus as claimed in claim 12, wherein the control unit determines the reception state as an abnormal state if the PER is equal to or greater than a preset value.

14. The display apparatus as claimed in claim 10, wherein if the broadcast receiving apparatus has a wireless communication access point (AP) function, the control unit switches the wireless communication channel used by the wireless communication module to a new wireless communication channel if the reception state is normal after changing the wireless communication connection state.

15. The broadcast receiving apparatus as claimed in claim 14, further comprising a display unit which displays an on screen display (OSD), wherein the control unit controls the display unit to display the OSD including information indicating that the wireless communication channel used by the wireless communication module is switched.

16. The broadcast receiving apparatus as claimed as in claim 14, wherein the switched wireless communication channel is a channel having a farthest frequency band from a frequency band of a wireless communication channel previously used of channels within a frequency band used by the wireless communication module.

17. The broadcast receiving apparatus as claimed in claim 10, wherein if the broadcast receiving apparatus is a client of a wireless communication device, the control unit changes the wireless communication connection state back to a previous wireless communication connection state to communicate with an external AP if the reception state is normal after changing the wireless communication connection state, and controls the display unit to display the OSD including information indicating that the reception state is abnormal caused by channel interference with the wireless communication frequency and information for recommending switching the wireless communication channel to a new wireless communication channel.

18. The broadcast receiving apparatus as claimed in claim 10, wherein the wireless communication module use a Wi-Fi wireless environment.

* * * * *